(12) United States Patent
Oosthuizen

(10) Patent No.: US 11,329,824 B2
(45) Date of Patent: May 10, 2022

(54) SYSTEM AND METHOD FOR AUTHENTICATING A TRANSACTION

(71) Applicant: Entersekt International Limited, Ebene (MU)

(72) Inventor: Gerhard Gysbert Oosthuizen, Bellville (ZA)

(73) Assignee: Entersekt International Limited, Ebene (MU)

( * ) Notice: Subject to any disclaimer, the term of this patent is extended or adjusted under 35 U.S.C. 154(b) by 140 days.

(21) Appl. No.: 16/635,649

(22) PCT Filed: Aug. 3, 2018

(86) PCT No.: PCT/IB2018/055848
§ 371 (c)(1),
(2) Date: Jan. 31, 2020

(87) PCT Pub. No.: WO2019/026038
PCT Pub. Date: Feb. 7, 2019

(65) Prior Publication Data
US 2021/0135868 A1    May 6, 2021

(30) Foreign Application Priority Data
Aug. 3, 2017  (ZA) .................................. 2017/05244

(51) Int. Cl.
*H04L 29/06*  (2006.01)
*H04L 9/32*  (2006.01)
(Continued)

(52) U.S. Cl.
CPC ....... *H04L 9/3213* (2013.01); *G06Q 20/3823* (2013.01); *H04L 9/0825* (2013.01);
(Continued)

(58) Field of Classification Search
CPC ... H04L 9/3213; H04L 9/0825; H04L 9/0863; H04L 9/3226; H04L 2209/80; G06Q 20/3823
See application file for complete search history.

(56) References Cited

U.S. PATENT DOCUMENTS 8,477,941 B1 *  7/2013  Dhanoa ................. H04W 12/04
                                                    380/270
11,087,313 B1 *  8/2021  Winklevoss ....... G06Q 20/3674
(Continued)

FOREIGN PATENT DOCUMENTS

EP            3041185 A1 *  7/2016  .......... H04W 12/069

*Primary Examiner* — Shawnchoy Rahman
(74) *Attorney, Agent, or Firm* — Osha Bergman Watanabe & Burton LLP

(57) ABSTRACT

A system and method for authenticating a transaction are provided. In a method at a server computer of an authentication service provider, an authentication request is received which requests authentication of a transaction and includes transaction details describing the transaction. An encryption key being unique to the authentication service provider and a user mobile device is obtained. An authentication prompt including at least some of the transaction details is generated. A payload including the authentication prompt is encrypted using the encryption key to output an encrypted payload. The encrypted payload is provided via a first communication channel to a user for acquisition and decryption by the user mobile device using a decryption key corresponding to the encryption key.

21 Claims, 5 Drawing Sheets

(51) Int. Cl.
*G06Q 20/38* (2012.01)
*H04L 9/08* (2006.01)

(52) U.S. Cl.
CPC .......... *H04L 9/0863* (2013.01); *H04L 9/3226* (2013.01); *H04L 2209/80* (2013.01)

(56) References Cited

U.S. PATENT DOCUMENTS

| | | | |
|---|---|---|---|
| 2005/0236480 A1* | 10/2005 | Vrotsos | G06Q 20/346 235/439 |
| 2012/0160912 A1* | 6/2012 | Laracey | G06F 21/43 235/379 |
| 2015/0163211 A1* | 6/2015 | Chellappa | H04L 63/0876 713/155 |
| 2016/0275502 A1* | 9/2016 | Amancherla | G06Q 20/401 |
| 2017/0244692 A1* | 8/2017 | Bhupathiraju | H04L 63/18 |
| 2017/0286958 A1* | 10/2017 | Herman | G06Q 20/3821 |
| 2021/0184851 A1* | 6/2021 | Blythe | H04L 63/0428 |

* cited by examiner

SYSTEM AND METHOD FOR AUTHENTICATING A TRANSACTION

CROSS-REFERENCE TO RELATED APPLICATIONS

This application claims priority from South African provisional patent application number 2017/05244 filed on 3 Aug. 2017, which is incorporated by reference herein.

FIELD OF THE INVENTION

This invention relates to a system and method for authenticating a transaction.

BACKGROUND TO THE INVENTION

One-time passwords (OTPs) are used by some authentication services to overcome shortcomings associated with traditional authentication based on a username-password combination. As the name suggests, an OTP is a password that is typically valid for only one login session or transaction. Two example OTP algorithms are the hashed message authentication code (HMAC)-based OTP (HOPT) algorithm and the time-based OTP (TOPT) algorithm. These algorithms are described in the Internet Society's Request for Comments documents.

In some (termed "offline") implementations, an OTP may be generated using a shared secret held by each of a user and an authentication service. This shared secret may be used to generate an OTP, which, by virtue of the shared secret, is known to only the user and authentication service. In other ("online") implementations, the authentication service may be responsible for generating the OTP and may transmit the generated OTP to the user, typically via another communication channel (or "out-of-band").

The user may provide the OTP, which he or she has either generated locally using the shared secret or received from the authentication service via another communication channel, to the authentication service for verification, in some cases together with a username and conventional (static) password.

OTPs are typically used to enable two factor authentication. This may involve obtaining and validating data from two of the following three factors: 'something I have', 'something I know' and 'something I am'. In the context of two factor authentication, OTPs are typically used as a representation of 'something I have' (e.g. being either the phone to which the OTP was sent or a hardware token in an offline implementation).

OTPs may also be used to enable so-called "strong authentication" for authenticating users attempting to log on to remote systems or for securing sensitive transactions.

One advantage of OTPs (in particular TOTPs) is that they are not as vulnerable to replay attacks as a static password may be. This means that a nefarious third party who manages to obtain an OTP that has already been verified by an authentication service will not be able to abuse it, as there is a good chance it will no longer be valid.

However, OTPs are still capable of being intercepted.

U.S. Pat. No. 9,363,259 discloses an authentication process using a certificate and private key installed on a mobile device and a nonce generated on the server. To authenticate a user, a server generates a nonce, encrypts the nonce with a public key associated with the user, and encodes the encrypted nonce in a quick response (QR) code. The resulting QR code is displayed to the user, and a mobile device scans the QR code to recover the encrypted nonce.

The encrypted nonce is decrypted using a private key stored on the mobile device. The clear text nonce is then displayed on the screen of the mobile device and used as an OTP for authentication.

Available art may not be sufficiently robust to so-called "man-in-the-middle" attacks. Further, the available art may not sufficiently address security vulnerabilities associated with offline OTPs. Accordingly, there remains scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method conducted at a server computer of an authentication service provider comprising: receiving an authentication request, the authentication request requesting authentication of a transaction and including transaction details describing the transaction; obtaining an encryption key being unique to the authentication service provider and a user mobile device; generating an authentication prompt including at least some of the transaction details; encrypting a payload including the authentication prompt using the encryption key to output an encrypted payload; and, providing the encrypted payload via a first communication channel to a user for acquisition and decryption by the user mobile device using a decryption key corresponding to the encryption.

A further feature provides for the encrypted payload to be provided for one of the group of: optical; tactile; audio; or, radio frequency capturing by the user mobile device.

A still further feature provides for the payload to include a nonce and authentication prompt for encryption.

Yet further features provide for the first communication channel to be established between the server computer and a user communication device, and for the first communication channel to be a secure communication channel; for providing the encrypted payload to the user to include transmitting the encrypted payload to the user communication device via the first communication channel for providing the encrypted payload to the user; and, for the authentication request to be received from a transaction service provider facilitating the transaction, for the first communication channel to be established between the server computer, transaction service provider and the user communication device and for providing the encrypted payload to the user to include transmitting the encrypted payload to the transaction service provider for on-forwarding to the user device.

An even further feature provides for providing the encrypted payload via the first communication channel to include: generating a graphical code based on the encrypted payload; and, providing the graphical code for display to the user via the first communication channel.

A yet further feature provides for obtaining the encryption key to include accessing a mobile device public key stored at the authentication service provider and being uniquely associated with a mobile device private key securely stored in the mobile device.

An even further feature provides for obtaining the encryption key to include: obtaining a symmetric key; and, accessing the mobile device public key and an authentication service provider private key being securely stored at the authentication service provider and being uniquely associated with an authentication service provider public key accessible to the mobile device.

A further feature provides for encrypting the payload to include: encrypting the payload using the symmetric key to output a symmetrically encrypted payload; asymmetrically encrypting the symmetric key using one or both of the mobile device public key and the authentication service provider private key to output an asymmetrically encrypted symmetric key; and, for the encrypted payload to include the symmetrically encrypted payload and the asymmetrically encrypted symmetric key.

A further feature provides for the method to include: receiving a validation request including a token based on or including one or both of the transaction details and the nonce; validating the token; and, if the token is valid, transmitting an authentication confirmation message confirming authentication of the transaction; and for the validation request to be received via the first communication channel.

Still further features provide for the token to be based on the nonce, for the nonce to be a challenge, for the token to be a response to the challenge generated at the user mobile device using an algorithm, and for validating the token to include validating that the token is the expected response to the challenge.

Yet further features provide for the token to be based on the transaction details, for the transaction details to be a challenge and for the token to be a response to the challenge generated at the user mobile device using an algorithm, and for validating the token to include validating that the token is the expected response to the challenge.

Still further features provide for the token to be based on user input in the form of one or both of a registered passcode or biometric, and for validating the token to include validating that the registered passcode or biometric was used to generate the token.

In another embodiment, the nonce and token are the same and are in the form of a password, and for validating the token to include validating that the token matches the nonce.

In accordance with a further aspect of the invention there is provided a computer-implemented method conducted at a user mobile device comprising: capturing an encrypted payload, the encrypted payload including an authentication prompt relating to authentication of a transaction and including transaction details describing the transaction; accessing a decryption key for decrypting the encrypted payload, the decryption key corresponding to an encryption key having been used at an authentication service provider to encrypt the payload and being unique to the authentication service provider and the user mobile device; using the decryption key to decrypt the encrypted payload to obtain the authentication prompt including the transaction details; displaying, via a display of the user mobile device, the authentication prompt including the transaction details and prompting a user of the user mobile device to authenticate the transaction; and, providing a token based on or including one or both of the transaction details or a nonce for submission to the authentication service provider.

A further feature provides for capturing the encrypted payload to include one of the group of: optical; tactile; audio; or, radio frequency capturing by the user mobile device.

A further feature provides for the encrypted payload to include the nonce.

A further feature provides for optically capturing the encrypted payload to include optically capturing a graphical code based on the encrypted payload, the graphical code being displayed to the user via a user communication device.

Still further features provide for the encrypted payload to be provided to the user by a transaction service provider facilitating the transaction, and for the transaction service provider to have received the encrypted payload from the authentication service provider.

A yet further feature provides for accessing the decryption key to include accessing a mobile device private key securely stored in the mobile device and uniquely associated with a mobile device public key stored at the authentication service provider in association with the mobile device.

An even further feature provides for accessing the decryption key to include: accessing the mobile device private key and an authentication service provider public key being uniquely associated with an authentication service provider private key securely stored at the authentication service provider.

Further features provide for the encrypted payload to include a symmetrically encrypted payload and an asymmetrically encrypted symmetric key, and for the method to include: asymmetrically decrypting the symmetric key using one or both of the authentication service provider public key and the mobile device private key to output the symmetric key.

Still further features provide for using the decryption key to decrypt the encrypted payload to include: using the output symmetric key to decrypt the symmetrically encrypted payload to obtain the authentication prompt including the transaction details.

Further features provide for the token to be based on the nonce, and for providing the token to include: generating the token using the nonce as an input to an algorithm; and, displaying the token to the user via the display of the user mobile device for submission by the user to the authentication service provider.

Still further features provide for the token to be based on the transaction details, and for providing the token to include: generating the token using the transaction details as an input to an algorithm; and, displaying the token to the user via the display of the user mobile device for submission by the user to the authentication service provider.

A further feature provides for generating the token to include using user input as a further input to the algorithm; for the user input to be in the form of one or both of a registered passcode or biometric.

In another embodiment, the nonce and token are the same and are in the form of a password, and for providing the token to include displaying the nonce as the token to the user via the display of the user mobile device for submission by the user to the transaction service for on-forwarding to the authentication service provider.

An even further feature provides for displaying the token to the user to include displaying the token in the prompt together with the transaction details.

In accordance with a further aspect of the invention there is provided a system including a server computer of an authentication service provider including memory for storing computer-readable program code and a processor for executing the computer-readable program code, the server computer comprising: an authentication request receiving component for receiving an authentication request, the authentication request requesting authentication of a transaction and including transaction details describing the transaction; an encryption key obtaining component for obtaining an encryption key being unique to the authentication service provider and a user mobile device; an authentication prompt generating component for generating an authentication prompt including at least some of the transaction details; an encrypting component for encrypting a payload including the authentication prompt using the encryption key to output an encrypted payload; and, a prompt providing component for providing the encrypted payload via a first communication channel to a user for acquisition and decryption by the user mobile device using a decryption key corresponding to the encryption key.

A further feature provides for the prompt providing component to provide the encrypted payload for one of the group of: optical; tactile; audio; or, radio frequency capturing by the user mobile device.

A further feature provides for the payload to include a nonce and the authentication prompt for encryption.

Still further features provide for the first communication channel to be established between the server computer and a user communication device, and for the first communication channel to be a secure communication channel; for providing the encrypted payload to the user to include transmitting the encrypted payload to the user communication device via the first communication channel for providing the encrypted payload to the user; and for the authentication request to be received from a transaction service provider facilitating the transaction, for the first communication channel to be established between the server computer, transaction service provider and the user communication device and for providing the encrypted payload to the user to include transmitting the encrypted payload to the transaction service provider for on-forwarding to the user device.

A further feature provides for the prompt providing component to include: a graphical code generating component for generating a graphical code based on the encrypted payload; and, for the prompt providing component to provide the graphical code for display to the user via the first communication channel.

A yet further feature provides for the encryption key obtaining component to be configured to access a mobile device public key stored at the authentication service provider and being uniquely associated with a mobile device private key securely stored in the mobile device.

An even further feature provides for the encryption key obtaining component to be configured to: obtain a symmetric key; and, access the mobile device public key and an authentication service provider private key being securely stored at the authentication service provider and being uniquely associated with an authentication service provider public key accessible to the mobile device.

A further feature provides for the encrypting component to be configured to: encrypt the payload using the symmetric key to output a symmetrically encrypted payload; asymmetrically encrypt the symmetric key using one or both of the mobile device public key and the authentication service provider private key to output an asymmetrically encrypted symmetric key; and, for the encrypted payload to include the symmetrically encrypted payload and the asymmetrically encrypted symmetric key.

A still further feature provides for the system to include a validation component, including: a validation request receiving component for receiving a validation request including a token based on or including one or both of the transaction details and the nonce; a token validation component for validating the token; and, an authentication confirmation message transmitting component for, if the token is valid, transmitting an authentication confirmation message confirming authentication of the transaction.

Yet further features provide for the token to be based on the nonce, for the nonce to be a challenge and for the token to be a response to the challenge generated at the user mobile device using an algorithm, and for the token validating component to be configured to validate that the token is the expected response to the challenge.

Even further features provide for the token to be based on the transaction details, for the transaction details to be a challenge and for the token to be a response to the challenge generated at the user mobile device using an algorithm, and for the token validating component to be configured to validate that the token is the expected response to the challenge.

Further features provide for the token to be based on user input in the form of one or both of a registered passcode or biometric, and for the token validating component to be configured to validate that the registered passcode or biometric was used to generate the token.

In another embodiment the nonce and token are the same and are in the form of a password, and for the token validating component to be configured to validate that the token matches the nonce.

In accordance with a further aspect of the invention there is provided a system including a user mobile device including memory for storing computer-readable program code and a processor for executing the computer-readable program code, the user mobile device comprising: a capturing component for capturing an encrypted payload including an authentication prompt relating to authentication of a transaction and including transaction details describing the transaction; a decryption key accessing component for accessing a decryption key for decrypting the encrypted payload, the decryption key corresponding to an encryption key having been used at an authentication service provider to encrypt the authentication prompt and being unique to the authentication service provider and the user mobile device; a decryption component for using the decryption key to decrypt the encrypted payload to obtain the authentication prompt including the transaction details; a display component for displaying, via a display of the user mobile device, the authentication prompt including the transaction details and prompting a user of the user mobile device to authenticate the transaction; and, a token providing component for providing a token based on or including one or both of the transaction details or a nonce for submission to the authentication service provider.

A further feature provides for the capturing component to be configured for one of the group of: optical; tactile; audio; or, radio frequency capturing of the encrypted payload.

A further feature provides for the encrypted payload to include the nonce.

A further feature provides for the capturing component to be configured to capture optically a graphical code based on the encrypted payload, the graphical code being displayed to the user via a user communication device.

Still further features provide for the encrypted payload to be provided to the user by a transaction service provider facilitating the transaction, and for the transaction service provider to have received the encrypted payload from the authentication service provider.

A yet further feature provides for the decryption key accessing component to be configured to access a mobile device private key securely stored in the mobile device and uniquely associated with a mobile device public key stored at the authentication service provider in association with the mobile device.

An even further feature provides for the decryption key accessing component to be configured to: access the mobile device private key and an authentication service provider public key being uniquely associated with an authentication service provider private key securely stored at the authentication service provider.

Further features provide for the encrypted payload to include a symmetrically encrypted payload and an asymmetrically encrypted symmetric key; for the decryption key accessing component to be configured to asymmetrically decrypt the symmetric key using one or both of the authentication service provider public key and the mobile device private key to output the symmetric key.

Still further features provide for the decryption component to be configured to use the output symmetric key to decrypt the symmetrically encrypted payload to obtain the authentication prompt including the transaction details.

Yet further features provide for the token to be based on the nonce, and for the token providing component to include: a token generating component for generating the token using the nonce as an input to an algorithm; and, a token display component for displaying the token to the user via the display of the user mobile device for submission by the user to the authentication service provider.

Even further features provide for the token to be based on the transaction details, and for the token providing component to include: a token generating component for generating the token using the transaction details as an input to an algorithm; and, a token display component for displaying the token to the user via the display of the user mobile device for submission by the user to the authentication service provider.

Further features provides for the token generating component to be configured to use user input as a further input to the algorithm; for the user input to be in the form of one or both of a registered passcode or biometric.

In another embodiment, the nonce and token are the same and are in the form of a password, and for the token providing component to include a token display component for displaying the nonce as the token to the user via the display of the user mobile device for submission by the user to the transaction service provider for on-forwarding to the authentication service provider.

An even further feature provides for the token display component to display the token to the user in the prompt together with the transaction details.

In accordance with a further aspect of the invention there is provided a computer program product comprising a computer-readable medium having stored computer-readable program code for performing the steps of: receiving an authentication request, the authentication request requesting authentication of a transaction and including transaction details describing the transaction; obtaining an encryption key being unique to the authentication service provider and a user mobile device; generating an authentication prompt including at least some of the transaction details; encrypting a payload including the authentication prompt using the encryption key to output an encrypted payload; and, providing the encrypted payload via a first communication channel to a user for acquisition and decryption by the user mobile device using a decryption key corresponding to the encryption key.

In accordance with a further aspect of the invention there is provided a computer program product comprising a computer-readable medium having stored computer-readable program code for performing the steps of: capturing an encrypted payload, the encrypted payload including an authentication prompt relating to authentication of a transaction and including transaction details describing the transaction; accessing a decryption key for decrypting the encrypted payload, the decryption key corresponding to an encryption key having been used at an authentication service provider to encrypt the authentication prompt and being unique to the authentication service provider and the user mobile device; using the decryption key to decrypt the encrypted payload to obtain the authentication prompt including the transaction details; displaying, via a display of the user mobile device, the authentication prompt including the transaction details and prompting a user of the user mobile device to authenticate the transaction; and, providing a token based on or including one or both of the transaction details or a nonce for submission to the authentication service provider.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Aspects of the present disclosure relate to transaction authentication. Some aspects of the present disclosure are directed towards delivery of an encrypted payload for the purpose of transaction authentication. In particular, aspects of the disclosure are directed towards the authentication of a transaction including providing a graphical code representing an encrypted payload. The encrypted payload may include a nonce and transaction details describing the transaction. The graphical code may for example be displayed to the user by a transaction service provider facilitating the transaction (e.g. by way of a webpage) and is configured for optical acquisition by an enrolled user mobile device. The user mobile device is configured to capture and decode the graphical code to obtain the encrypted payload. The user mobile device is further configured to decrypt the encrypted payload, including decrypting the nonce and the transaction details. The user mobile device may use one or more appropriate decryption keys which have been obtained by the user mobile device by way of a secure process (which may involve another communication channel).

The encryption and decryption key-pair is unique to and known only to the authentication service provider and the user mobile device and hence only the intended user mobile device (and not another mobile device) is able to decrypt the encrypted payload. Successful decryption of the encrypted payload yields the nonce and the transaction details for display to the user. The transaction details may be reviewed by the user to ensure that they describe the transaction that is currently underway. In some implementations, the nonce may be used as a one-time-password (e.g. for input by the user into the computing device which is interacting with the transaction service provider) or may be used by the user mobile device to perform a challenge-response operation to generate a token for validation by the authentication service provider.

Including the transaction details in the encrypted payload, and hence protecting the transaction details from unauthorised interference, may significantly reduce the opportunity for man-in-the-middle attacks by nefarious third parties.

The described system and method may have the effect of tying the user authentication to the transaction details. In an offline scenario, where the user mobile device is offline (e.g. not connected to the authentication service and/or transaction service, and possibly not connected to the Internet or other communication network), this may ensure that the authentication provided by the user relates to the transaction that the user is conducting (and not a fraudulent one).

Figure 1:
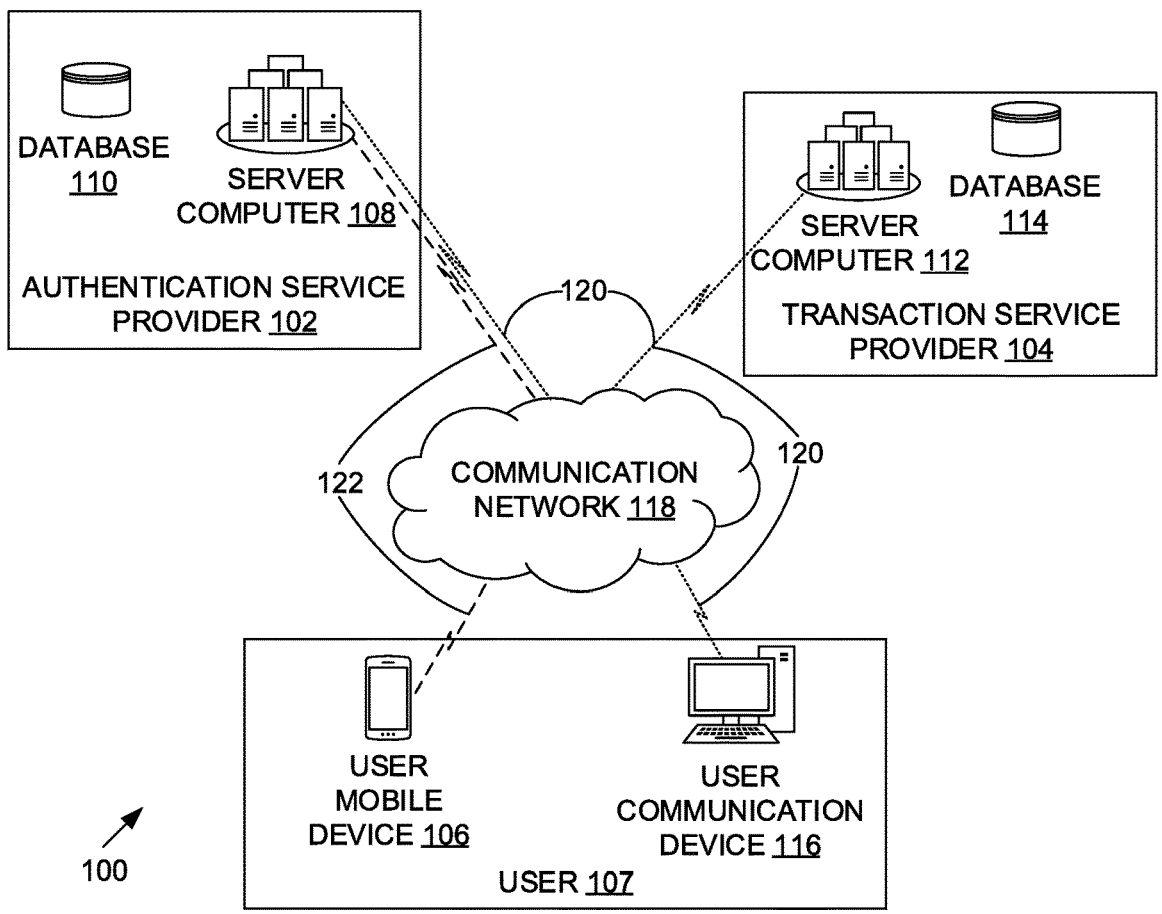
FIG. 1 is a schematic diagram which illustrates an exemplary system for authenticating a transaction according to aspects of the present disclosure.

FIG. 1 is a schematic diagram which illustrates an exemplary system (100) for authenticating a transaction. The system may include an authentication service provider (102), a transaction service provider (104) and a user mobile device (106) associated with a user (107). Although only one transaction service provider (104) and one user mobile device (106) are described and illustrated, it should be appreciated that in a practical implementation there may be a plurality of each of these.

In some implementations, the authentication service provider (102) may be an independent third party providing authentication services to a number of transaction service providers, while in other implementations the authentication service provider may be an extension of the transaction service provider for exclusive use by the transaction service provider.

The authentication service provider (102) may have access to a server computer (108), which may be any suitable computing device performing a server function. The server computer (108) may have access to a database (110) in which a record of the user, having enrolled with the authentication service provider (102), may be stored.

The record may include a user identifier identifying the user and a unique user mobile device identifier by way of which a user mobile device having been enrolled with the authentication service provider (102) may be identified. In some implementations, the unique user mobile device identifier may be a user mobile device digital certificate or related data (e.g. data signed using such as certificate). The user mobile device (106) may have been enrolled with the authentication service provider during an enrolment process during which the unique user mobile device identifier (and hence the user mobile device) is uniquely linked to the user record (and hence the user).

The link between the user and the user mobile device may be verified by: the user physically presenting the user mobile device to the authentication service provider; the user answering a series of knowledge-based questions (the answers to which are known by the authentication service provider); the user providing other credentials (e.g. user name, password and/or identifying information, such as full name, national identity number, etc.) to the authentication service provider, which credentials may already be known to the authentication service provider or which the authentication service provider can verify with the transaction service provider; or the like.

In this manner, a one-to-one link is created between the user mobile device and the user, and the authentication service provider can know with a suitably high degree of certainty that when it is interacting with the user mobile device, it is interacting with the user. The record may also include a challenge-response algorithm. The challenge-response algorithm may be unique to the user and may be used for validating tokens in challenge-response authentication implementations. In some cases, the record may be configured to temporarily store nonces generated by the authentication service provider for the purpose of authenticating a single transaction, transaction details relating to a pending transaction and a registered passcode and/or biometric (e.g. fingerprint, retina scan, etc.).

The transaction service provider (104) may provide transaction services to users. "Transaction services" as used herein may be construed broadly to include any exchange or interaction between the transaction service provider and the user. In some cases, the transaction services may relate to financial transactions (e.g. payments or purchases) while in other cases, transaction services may include logging on to a secure domain or the like.

The transaction service provider (104) may have access to a server computer (112), which may be any suitable computing device configured to perform a server function. The transaction service provider (104) may also have access to a database (114) in which a user account may be stored, against which the user may be permitted to transact.

The user may be permitted to transact with the transaction service provider (104) remotely, using a suitable communication device (116) associated with the user. The user may for example interact with the transaction service provider (104) by using the user communication device (116) to request access to a secure website hosted by the transaction service provider (104), to make a payment or the like.

The user mobile device (106) may be any suitable, portable communications device, such as a mobile phone, smart phone, tablet computer, etc. The user mobile device (106) may have a software application stored thereon and configured to interact with one or both of the authentication service provider and the transaction service provider. The user mobile device (106) may be identifiable by way of a unique user mobile device identifier. In some implementations, the unique user mobile device identifier may be created by the mobile software application using a random number generated by, and known only to, the mobile software application such that the identifier cannot be re-created without the particular mobile device of the user.

The user communication device (116) may be a further communication device in the user's control in addition to the user mobile device (106) or, in some cases, the user communication device and user mobile device (106) may be one and the same device. The user communication device (116) may be suitable for interacting with the transaction service provider (104), for example by accessing a website or other online service provided by the transaction service provider (104).

The computing devices (108, 112, 106, 116) of the system (100) may be configured to communicate, e.g. by exchanging data and/or messages, with one another via an appropriate communication network (118), such as the Internet. It will become apparent below that a first communication channel (120) may extend between the authentication service provider (102), transaction service provider (104) and user communication device (116). The first communication channel (120) may be a secure communication channel.

The system and method described herein may enable a further communication channel to be established over the first communication channel (120) which is not capable of interception by either of the user communication device or the transaction service provider (and any men in the middle). This further communication channel may enable the authentication service provider (102) to communicate securely with the user mobile device (106). This further communication channel may be "tunnelled through" the first communication channel (120) and may be achieved by way of the encrypted payload which only the user mobile device can decrypt. As will be explained in greater detail below, the further communication channel (i.e. the tunnel established via the first communication channel) may obviate the need for a second, direct communication channel (122) to be established between the authentication service provider and the user mobile device.

Figure 2:
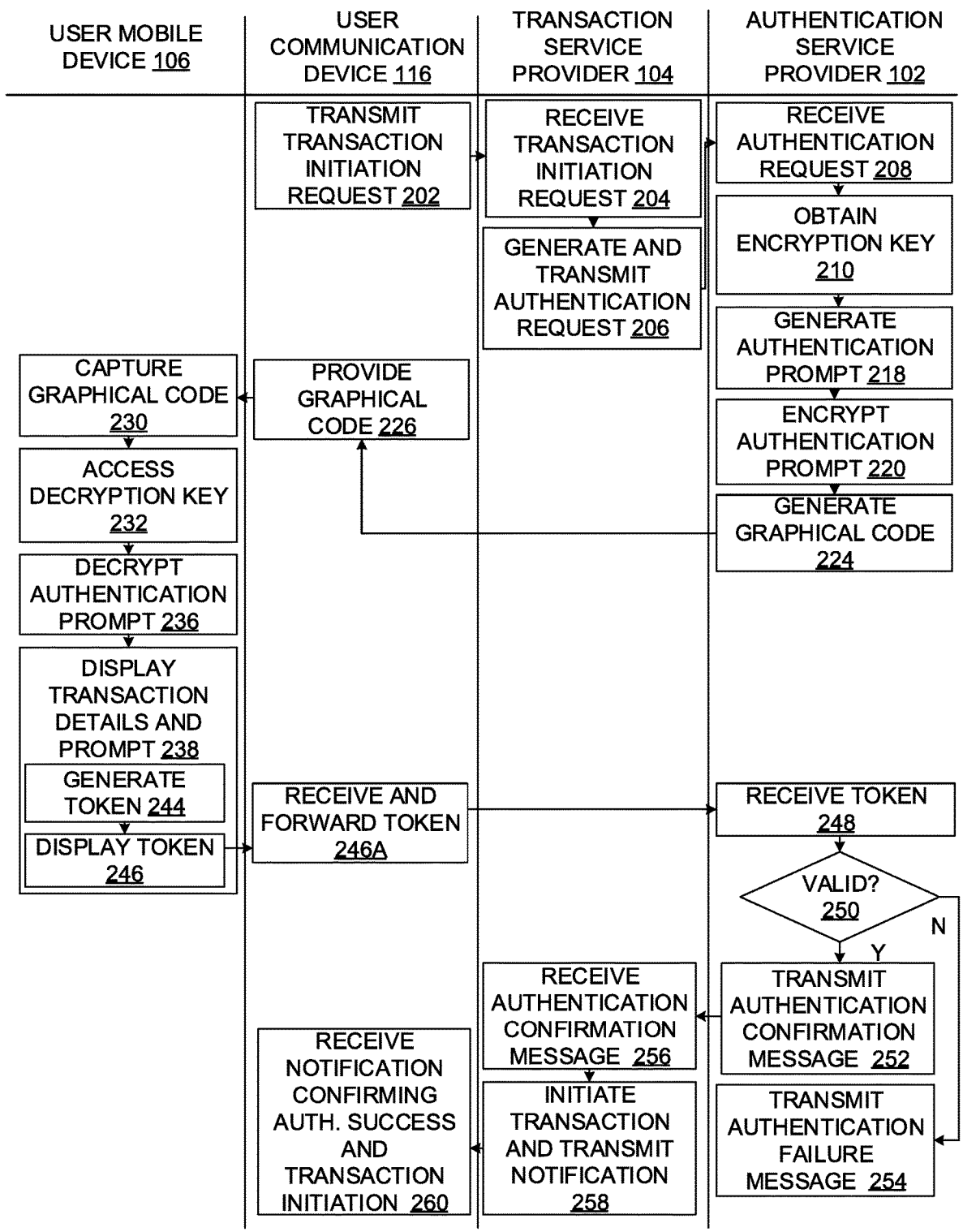
FIG. 2 is a swim-lane flow diagram which illustrates an exemplary method for authenticating a transaction.
Figure 3A:
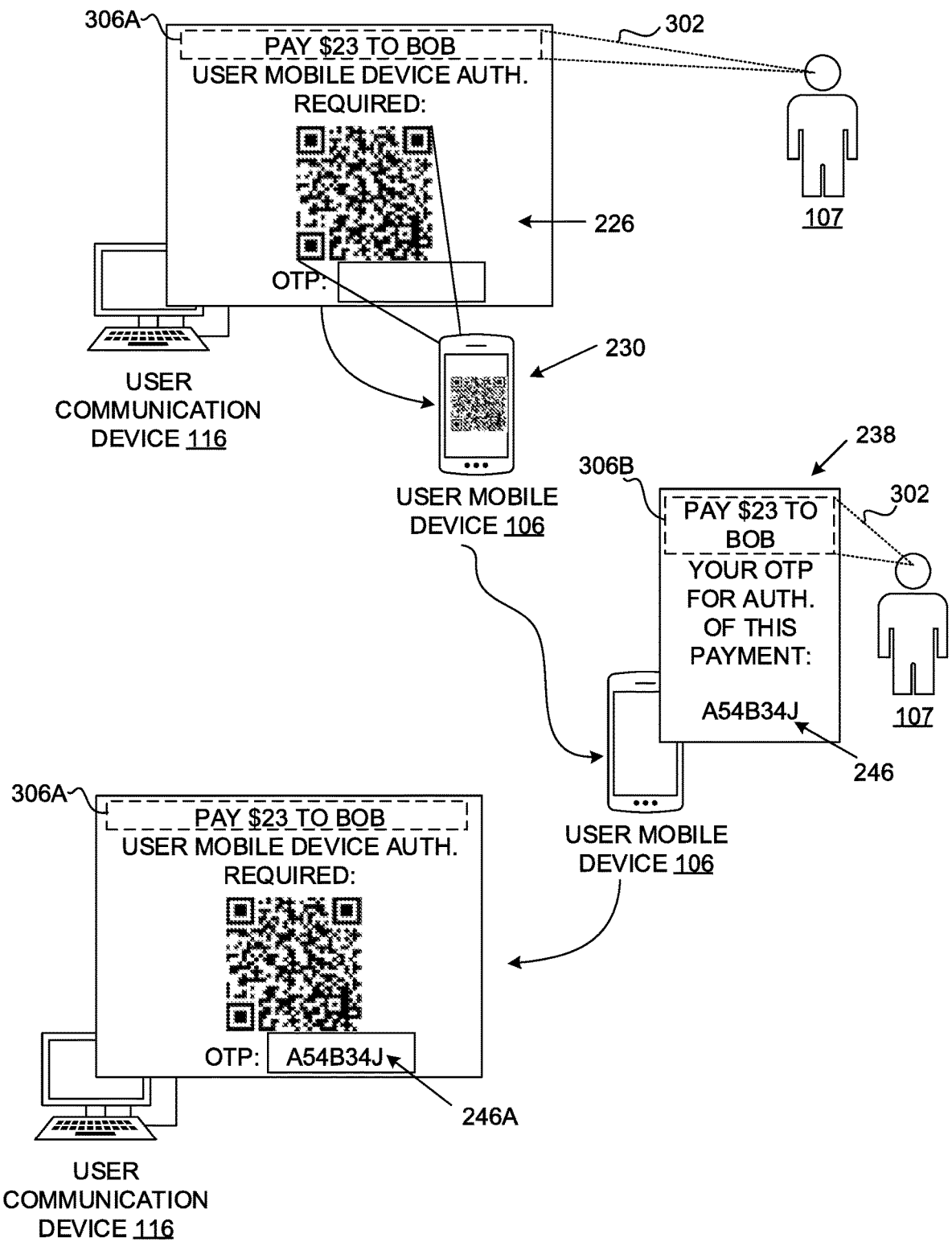
FIG. 3A is a schematic diagram which illustrates an exemplary scenario of the described system and method in use from the perspective of the user, without an attempted man-in-the middle attack.
Figure 3B:
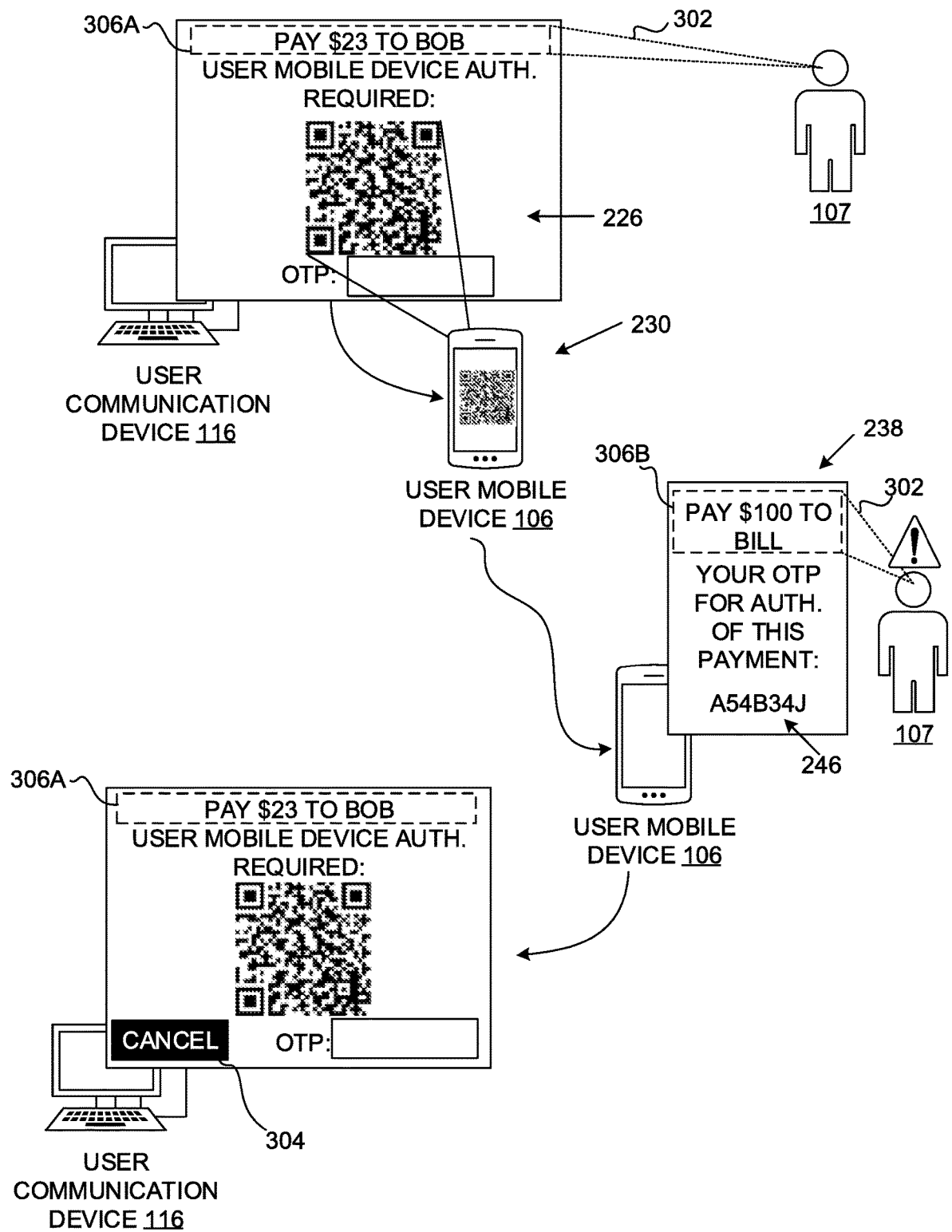
FIG. 3B is a schematic diagram which illustrates an exemplary scenario of the described system and method in use from the perspective of the user, with an attempted man-in-the-middle attack.

The system (100) described above may implement a method for authenticating a transaction. An exemplary method for authenticating a transaction is illustrated in the swim-lane flow diagram of FIG. 2, in which respective swim-lanes delineate steps, operations or procedures performed by respective entities or devices. Aspects of the method which are perceived by the user are illustrated in FIGS. 3A and 3B.

The user (107) may use the user communication device (116) to initiate a transaction with the transaction service provider (104). The transaction may be a transaction against a user account maintained by the transaction service provider (104) associated with the user (107). As one example, the user may use the user communication device (116) to conduct a financial transaction against a financial account. The user may already be logged in to an electronic banking platform (e.g. internet banking website) and may input an instruction to pay a new payee. As another example, the user (107) may use the user communication device (116) to access an online service provided by the transaction service provider (104). Exemplary online services include an internet banking facility, a cloud computing resource or any other appropriate facility offered to the user (107) by the transaction service provider (104). The transaction service provider (104) may therefore facilitate the transaction.

The user communication device (116) may transmit (202) a transaction initiation request message to the transaction service provider. The transaction initiation request message may include credentials identifying the user (107). In some implementations, the credentials may include a username and password. The transaction initiation request message may be transmitted from the user communication device (116) to the transaction service provider (104) via the communication network (118). Transmission via the communication network (118) may be via a secure communication channel established (e.g. using SSL) between the user communication device (116) and the transaction service provider (104).

The transaction service provider (104) may receive (204) the transaction initiation request message from the user communication device (116). The transaction service provider may validate the credentials included in the transaction initiation request message and may determine that authentication of the transaction (or strong authentication) is required.

The transaction service provider (104) may generate and transmit (206) an authentication request to the authentication service provider (102). The authentication request may request authentication of the transaction against the user account and may include transaction details describing the transaction and a user identifier identifying the user (107). The authentication request may request out-of-band authentication using a third factor (e.g. "something I have", in addition to the "something I know" already provided to the transaction service provider). The authentication request may be transmitted from the transaction service provider (104) to the authentication service provider (102) via the communication network (118). Transmission between the transaction service provider (104) and the authentication service provider (102) via the communication network (118) may be via a secure communication channel.

The authentication service provider (102) may receive (208) the authentication request requesting authentication of the transaction against the user account. The authentication request may be received from the transaction service provider (104) via the secure communication channel.

The authentication service provider (102) may obtain (210) an encryption key being unique to the authentication service provider and user mobile device.

Obtaining (210) the encryption key may include obtaining a symmetric key. This may include generating a session-specific encryption key which is unique to the authentication service provider (102) and the user mobile device (106) and configured for symmetric encryption and decryption.

Obtaining (210) the encryption key may also include accessing a mobile device public key stored at the authentication service provider (e.g. in the database (110)) and being uniquely associated with a mobile device private key securely stored in the mobile device (106). The authentication service provider (102) may also access an authentication service provider private key being securely stored at the authentication service provider and being uniquely associated with an authentication service provider public key accessible to the mobile device.

In some cases, for example, a digital certificate may have been issued to or generated by each of the authentication service provider (102) and the user mobile device (106) and the public keys of each of the mobile device and authentication service provider may be exchanged by way of a certificate exchange and validation process.

The authentication service provider (102) may generate (218) an authentication prompt. The authentication prompt may include the transaction details and may be configured to cause the user mobile device (106) to prompt the user (107) to authenticate (or decline to authenticate) the transaction described in the transaction details. Generating (218) the authentication prompt may include generating a nonce coupled to the authentication prompt. The nonce may be any suitable, newly generated random number. In some cases, the nonce may be a cryptographic nonce. In other implementations, a nonce may not be required.

The authentication service provider (102) may encrypt (220) a payload including the authentication prompt (and optionally the nonce) using the encryption key to generate an encrypted payload. The encrypted payload may include the authentication prompt (which includes the transaction details) and optionally the nonce. Including and encrypting the transaction details (in the authentication prompt) together with the nonce may tie the nonce and transaction details together, such that they may not be separated by nefarious third parties not having access to the corresponding decryption key. The nonce may add randomness to the encrypted payload and may be used in generating a token.

Encrypting (220) the payload may include encrypting the authentication prompt and optionally the nonce using the symmetric key to output a symmetrically encrypted payload. The authentication service provider (102) may asymmetrically encrypt the symmetric key using one or both of the mobile device public key and the authentication service provider private key to output an encrypted symmetric key.

Asymmetrically encrypting the symmetric key may for example include encrypting the symmetric key using the mobile device public key to output a first encryption of the symmetric key and decrypting the first encryption of the symmetric key using the authentication service provider private key to output a second encryption of the symmetric key. Encrypting (220) the payload may output an encrypted payload including the symmetrically encrypted payload and the second encryption of the symmetric key (or simply the encrypted symmetric key).

By using both the mobile device public key and the authentication service provider private key to encrypt the symmetric key, the resulting encryption is tied to both parties (i.e. the user mobile device (106) and the authentication service provider (102)). This may prevent a man-in-the-middle from providing a spurious encrypted authentication prompt (e.g. using only the mobile device public key). In other implementations, the first encryption of the symmetric key may be signed using the authentication service provider private key for validation at the user mobile device.

Symmetric encryption of the payload may improve efficiencies and allow for larger payloads.

The authentication service provider (102) may provide the encrypted payload to the user (107) via the first communication channel (120) for optical acquisition and decryption by the user mobile device (106). As will be explained below, the user mobile device (106) is configured to obtain and decrypt the encrypted payload to obtain the authentication prompt for prompting the user for authentication of the transaction. This may include displaying at least the decrypted transaction details to the user. Providing the encrypted payload may be via the first communication channel (120) from where any physical presence or co-location mechanism may be used to provide the encrypted payload to the user mobile device (106).

In some implementations, providing the encrypted payload via the first communication channel may include generating (224) a graphical code based on the encrypted payload. The graphical code may be a graphical depiction of the encrypted payload and may for example be in the form of a barcode, quick response (QR) code or the like.

Providing the encrypted payload to the user may include providing the encrypted payload to the transaction service provider (104) via a secure communication link for output by the transaction service provider (104) to the user communication device (116).

For example in the case where the user is transacting with the transaction service provider via a website or other online platform, the authentication service provider (102) may transmit the encrypted payload to the transaction service provider (104) via a secure communication link. The transaction service provider (104) may transmit the encrypted payload to the user communication device (116) via a secure communication link. The user communication device (116) may provide (226) the encrypted payload to the user (107) by displaying or otherwise outputting the encrypted payload for acquisition by the user mobile device (106).

Providing the encrypted payload to the user (107) via the user communication device may cause the user communication device (116) to output the encrypted payload to the user and may be via the first communication channel. Providing and displaying the encrypted payload may include providing and displaying the graphical code. In other implementations, the encrypted payload may be encoded using one of: tactile; audio; or, radio frequency (RF) encoding and providing the encrypted payload may provide a tactile, audio or radio frequency output for capturing by the mobile device.

With the encrypted payload (or graphical code) being provided (e.g. displayed) to the user (107) via the user communication device (116), the user may use the user mobile device (106) to capture the encrypted payload. In some cases, the user may first launch the mobile software application on the user mobile device (106).

The user mobile device (106) may capture (230) the encrypted payload. Capturing (230) the encrypted payload may include capturing an optical-, tactile-, audio-, or radio frequency-encoded encrypted payload (e.g. using a camera, accelerometer, microphone or RF antenna) of the mobile device. The encrypted payload relates to authentication of the transaction and may include the nonce and the authentication prompt including transaction details describing the transaction. In the exemplary scenario described, capturing (230) the encrypted payload includes optically capturing the graphical code based on the encrypted payload (e.g. by using a camera of the user mobile device to take a picture of the graphical code) and decoding the graphical code to obtain the encrypted payload.

The user mobile device (106) may access (232) a decryption key for decrypting the encrypted payload. The decryption key corresponds to an encryption key having been used at the authentication service provider (102) to encrypt the authentication prompt.

The encrypted payload may include a symmetrically encrypted payload and an encrypted symmetric key. Accessing (232) the decryption key may include accessing a mobile device private key securely stored in the mobile device and uniquely associated with a mobile device public key securely stored in at the authentication service provider in association with the mobile device. The mobile device (106) may also access an authentication service provider public key being uniquely associated with an authentication service provider private key securely stored at the authentication service provider.

The encrypted symmetric key may be asymmetrically encrypted and the mobile device (106) may asymmetrically decrypt the encrypted symmetric key using one or both of the authentication service provider public key and the mobile device private key. Asymmetrically decrypting the encrypted symmetric key may include the mobile device (106) encrypting the encrypted symmetric key using the authentication service provider public key to output a first decryption of the encrypted symmetric key and decrypting the first decryption of the encrypted symmetric key using the mobile device private key to output a second decryption of the encrypted symmetric key for use in decrypting the symmetrically encrypted payload. The second decryption of the encrypted symmetric key may be the asymmetrically decrypted symmetric key, i.e. simply the symmetric key.

The user mobile device (106) may use the decryption key to decrypt (236) the encrypted payload to obtain the authentication prompt including the transaction details and optionally the nonce.

In implementations in which the encrypted payload includes the symmetrically encrypted payload and an encrypted symmetric key, decrypting (236) the encrypted payload may include using the second decryption of the encrypted symmetric key (or simply the decrypted symmetric key) to decrypt the symmetrically encrypted payload to obtain the authentication prompt including the transaction details (and in some implementations the nonce).

The user mobile device (106) may provide a token for submission to the authentication service provider (102) should the user decide to authenticate the transaction. The token may be based on or include the nonce.

The user mobile device (106) may display (238) a prompt including the transaction details and prompting the user (107) of the user mobile device (106) to authenticate the transaction. The prompt may be displayed to the user via a display of the user mobile device. The prompt displayed to the user may ask the user whether he or she wishes to authenticate the transaction as described in the transaction details. In an exemplary scenario in which the encrypted authentication prompt is generated in response to the user requesting to conduct a financial transaction with the transaction service provider, the prompt may ask the user whether he or she wishes to conduct the specific financial transaction (e.g. "Do you want to pay $50 to Bob Smith?", "Your OTP for the payment of $45 to Bill is 12334" or the like).

With reference to FIG. 3A, the user (107) may inspect (302) the transaction details being displayed on the user mobile device (106) for accuracy. This may include comparing these transaction details to those displayed on the user communication device (116) or otherwise ensuring that the transaction details being displayed on the user mobile device relate to the transaction that the user is actually conducting (and not a fraudulent transaction being conducted by a nefarious third party). In the case of the exemplary scenario illustrated in FIG. 3B, the user can see that the transaction details are different and that the authentication prompt does not relate to the transaction that the user is conducting and instead relates to a transaction being conducted by a nefarious third party. In such a case the user (107) may cancel (304) the transaction instead of proceeding.

In some cases, the transaction details displayed on the user mobile device (106) and user communication device (116) may be displayed in designated "security portions" (306A, 306B) configured to emphasise that the user should pay particular attention to this information.

As the transaction details which describe the transaction to which the pending authentication prompt relates have been encrypted in a manner such that only the user mobile device is capable of decrypting and displaying them, the user can know with a high degree of certainty that the authentication prompt relates to the transaction that the user has initiated and is in the process of completing (as opposed to a fraudulent transaction being conducted against the user account by a nefarious third party in a so-called man-in-the-middle attack).

In some implementations, challenge-response authentication may be implemented in which the nonce is the challenge and the token is the response. In such an implementation, the authentication prompt displayed to the user may require affirmative user input indicative of the user's authentication of the transaction (e.g. activation of a "yes" graphical icon, etc.). In some embodiments, the user mobile device (106) may request a passcode or biometric (e.g. fingerprint) input from the user, which may be used in generating the token. The passcode and/or biometric may have been previously registered with the authentication service provider for use in subsequently validating a received token. Providing the token may include receiving a confirmation input from the user in response to displaying the prompt.

The user mobile device (106) may generate (244) the token using one or both of the nonce and transaction details as inputs to an appropriate algorithm, such as challenge-response algorithm.

The algorithm may be unique to the user mobile device and may be known only to the user mobile device and the authentication service provider (102). The algorithm may alter the nonce and/or transaction details in a predictable manner such that the authentication service provider can use the same algorithm on the same nonce and/or transaction details to obtain a test token for the purpose of validating a received token. In another implementation, generating the token may use the transaction details (optionally together with the nonce) as an input to an algorithm. In some cases, generating (244) the token may include using the user input (in the form of a passcode or biometric) as a further input to the algorithm.

The user mobile device (106) may display (246) the token to the user via the display of the user mobile device for submission by the user to the transaction service provider and/or authentication service provider. The token may be displayed in the prompt together with the transaction details (e.g. in the same prompt).

The user may read the token being displayed on the user mobile device (106) and, if the user is satisfied that the authentication prompt relates to the transaction that the user is conducting, may input the displayed token into the user communication device (116).

The user communication device (116) may receive and forward (246A) the token input by the user. In some implementations, the token may be forwarded to the transaction service provider (104) via the secure communication channel for on-forwarding to the authentication service provider. In other implementations, the user communication device (116) may forward the token directly to the authentication service provider (102). The user communication device (106) may encrypt the token before transmission. In other implementations, other mediums for providing the token to the user communication device (116) may be used (e.g. optical, audio, tactile, radio frequency, etc.). The token may be transmitted to the authentication service provider via the first communication channel (120).

In another implementation, the nonce and token may be the same and may be in the form of a password. Providing the token may include displaying the nonce as the token to the user via the display of the user mobile device. The user may then submit the nonce (e.g. by inputting it into the user communication device) to the transaction service provider for on-forwarding to the authentication service provider.

In another implementation, the token may be transmitted from the user mobile device to the authentication service provider for validation thereat via a secure connection established between the user mobile device and the authentication service provider. The token may be transmitted in a validation request generated by the user mobile device.

The authentication service provider (102) may receive (248) the token. The token may be received from the user communication device (116) via the transaction service provider (104) and first communication channel (120). In another embodiment, the token may be received from the user mobile device in a validation request (e.g. via the second communication channel (122)).

The authentication service provider (102) may validate (250) the token. In some implementations, validating the token may include validating that the token is the expected response to the challenge. This may include obtaining (e.g. from the database (110)) the nonce having been generated by the authentication service provider for this particular transaction, and/or the transaction details and using the obtained nonce and/or transaction details as an input to the appropriate (e.g. corresponding challenge-response) algorithm. In some cases, a registered passcode and/or biometric may have been used to generate the token and validating the token may include accessing the registered passcode or biometric (or stored representations thereof) for input into the algorithm.

In some implementations, validating the token may include validating that the token matches the nonce.

If (250) the token is valid, the authentication service provider (102) may transmit (252) an authentication confirmation message confirming authentication of the transaction. The authentication confirmation message may be transmitted to the transaction service provider (104) and may indicate to the transaction service provider that the transaction has been authenticated by the user (107). Due to the enrolment process in which the user mobile device (106) is uniquely linked to the user, the authentication service provider, and hence the transaction service provider, can ascribe a low fraud risk to the authentication confirmation.

If (250) the token is not valid, the authentication service provider (102) may transmit (254) an authentication failure message indicating that the transaction has not been authenticated by the user (107).

The transaction service provider (104) may receive (256) the authentication confirmation message (or the authentication failure message, if applicable). The authentication confirmation message may be received from the authentication service provider and may confirm that the user has authenticated the intended or requested transaction. In response to receiving the authentication confirmation message, the transaction service provider (104) may initiate the transaction (as described in the transaction details) and may transmit (258) an appropriate notification to the user communication device (116).

The user communication device (116) may receive (260) the notification, which may confirm the authentication success and/or initiation of the transaction. Initiation of the transaction may be in accordance with the transaction details and may for example include permitting the user communication device to access a secure website, processing a payment, etc.

If an authentication failure message is received, the transaction service provider may decline to proceed with the requested or intended transaction.

Figure 4:
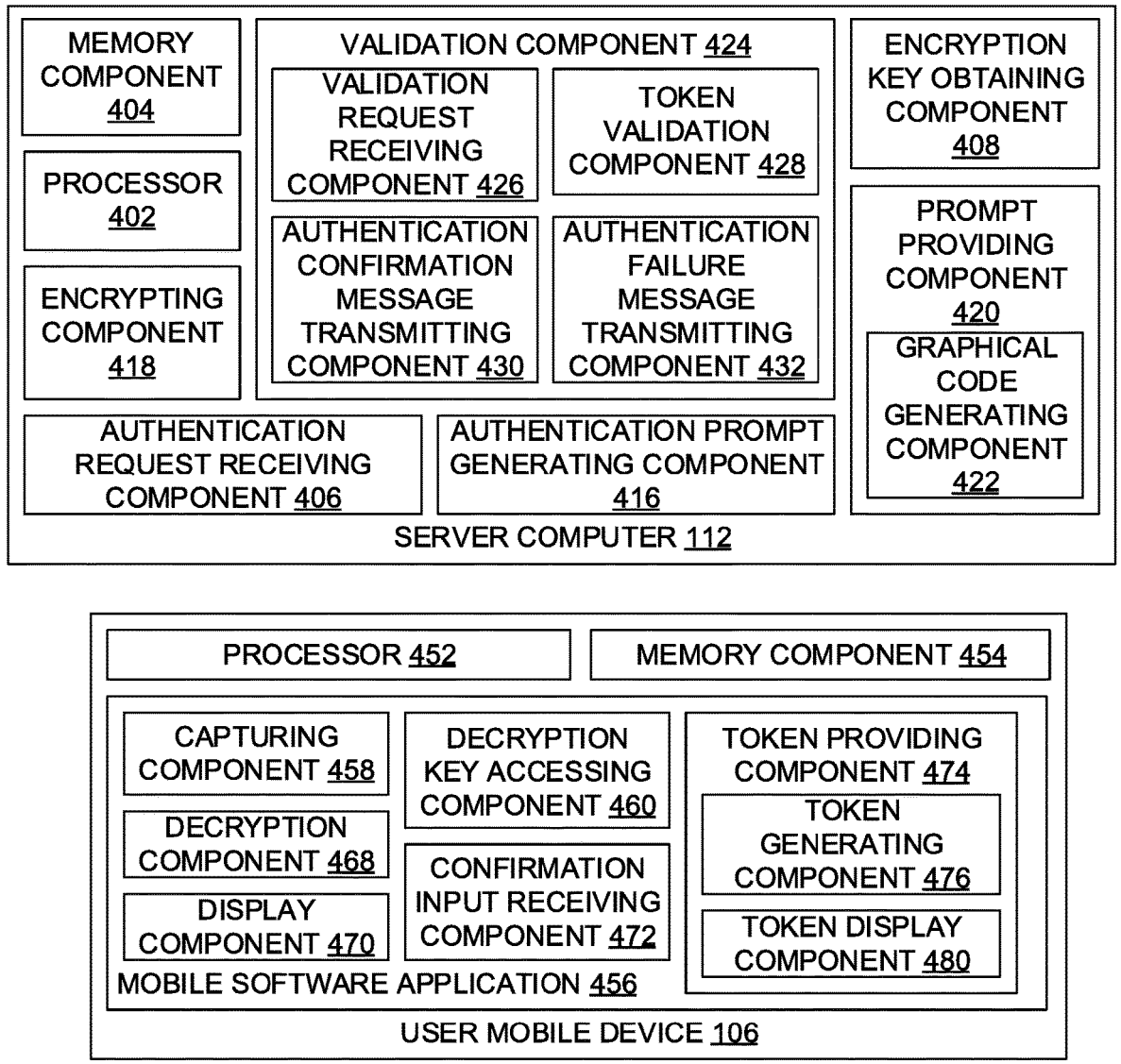
FIG. 4 is a block diagram which illustrates exemplary components which may be provided by a system for authenticating a transaction.

Various components may be provided for implementing the method described above with reference to FIG. 2. FIG. 4 is a block diagram which illustrates exemplary components which may be provided by a system (400) for authenticating a transaction. The system (400) may include a server computer (112) of an authentication service provider (102) and a user mobile device (106) associated with a user (107).

The server computer (112) may include a processor (402) for executing the functions of components described below, which may be provided by hardware or by software units executing on the server computer (112). The software units may be stored in a memory component (404) and instructions may be provided to the processor (402) to carry out the functionality of the described components.

The server computer (112) may include an authentication request receiving component (406) arranged to receive an authentication request. The authentication request may request authentication of a transaction and may include transaction details describing the transaction. The transaction may be a transaction against a user account and may be facilitated by the transaction service provider (104). The authentication request receiving component (406) may be arranged to receive the authentication request from the transaction service provider.

The server computer (112) may include an encryption key obtaining component (408) arranged to obtain an encryption key which is unique to the authentication service provider (102) and user mobile device (106). The encryption key obtaining component (408) may be configured to obtain a symmetric key and access a mobile device public key stored at the authentication service provider and being uniquely associated with a mobile device private key securely stored in the mobile device. The encryption key obtaining component (408) may be configured to access an authentication service provider private key being securely stored at the authentication service provider and being uniquely associated with an authentication service provider public key accessible to the mobile device.

The server computer (112) may include an authentication prompt generating component (416) arranged to generate an authentication prompt including the transaction details and optionally a nonce. The authentication prompt generating component (416) may also include a nonce generating component arranged to generate a nonce. The nonce generating component may be configured to generate a unique nonce for each authentication request received. In some implementations, the nonce generating component may be configured to generate a cryptographic nonce.

The server computer (112) may include an encrypting component (418) arranged to encrypt a payload including the authentication prompt (and optionally the nonce) using one or more of the encryption keys. The encrypting component (418) may use any suitable encryption algorithm or combination of algorithms.

The encrypting component (418) may be configured to encrypt the authentication prompt (and optionally the nonce) using the symmetric key to output a symmetrically encrypted payload. The encrypting component (418) may be configured to encrypt the symmetric key using the mobile device public key to output a first encryption of the symmetric key and may decrypt the first encryption of the symmetric key using the authentication service provider private key to output a second encryption of the symmetric key. The encrypted payload may include the symmetrically encrypted payload and the second encryption of the symmetric key for providing to the user. The symmetric key may be asymmetrically encrypted using one or both of the authentication service provider private key and the mobile device public key to output an asymmetrically encrypted symmetric key.

The server computer (112) may include a prompt providing component (420) arranged to provide the encrypted payload to the user for acquisition and decryption by the user mobile device (106). The prompt providing component (420) may provide the encrypted payload to the user via the first communication channel (120). In some implementations, the prompt providing component (420) may be configured to provide the encrypted payload to the transaction service provider (104) for display by the transaction service provider to the user via the user communication device (116) and first communication channel (120). Display to the user may be via website hosted by the transaction service provider which the user accesses using the user communication device (116).

In some implementations the encrypted payload may be rendered as a graphical code and the prompt providing component (420) may include a graphical code generating component (422) arranged to generate a graphical code based on the encrypted payload. The graphical code generating component may for example be configured to generate a barcode, QR code or the like in which the encrypted payload is encoded. The prompt providing component (420) may be arranged to provide the graphical code for display to the user via a user communication device.

The server computer (112) may include a validation component (424) arranged to validate a token received in connection with the transaction and purporting to confirm authentication of the transaction. The validation component (424) may include a validation request receiving component (426) arranged to receive a validation request including the token (which is based on or includes the nonce). The validation component (424) may include a token validation component (428) arranged to validate the token. The token validation component (428) may be configured to compare the received token to a corresponding nonce for a match or may be configured to compare the received token to a test token generated by inputting the corresponding transaction details and/or nonce into a predetermined algorithm (e.g. to determine whether the token is the expected response to a challenge based on the nonce/transaction details). The validation component (424) may further include an authentication confirmation message transmitting component (430) arranged to transmit an authentication confirmation message confirming authentication of the transaction if the token is valid. The validation component (424) may also include an authentication failure message transmitting component (432) arranged to transmit an authentication failure message if the token is not valid.

The user mobile device (106) may include a processor (452) for executing the functions of components described below, which may be provided by hardware or by software units executing on the user mobile device (106). The software units may be stored in a memory component (454) and instructions may be provided to the processor (452) to carry out the functionality of the described components. Some or all of the components may be provided by a mobile software application (456) downloadable onto and executable on the user mobile device (106).

The mobile software application (456) may include a capturing component (458) arranged to capture an encrypted payload. The capturing component (458) may be configured for one of the group of: optical; tactile; audio; or, radio frequency capturing of the encrypted payload. The encrypted payload may include an authentication prompt relating to authentication of a transaction and including transaction details describing the transaction. The encrypted payload may further include a nonce. In some implementations, the capturing component (458) may interface with a camera of the user mobile device (106) and may be configured to obtain optically a graphical code based on the encrypted payload. The graphical code (or encrypted payload) may be displayed to the user (107) by a transaction service provider (104) facilitating the transaction (e.g. via user communication device interacting with the transaction service provider). The capturing component (458) may include a decoding component for decoding the graphical code to obtain the encrypted payload.

The mobile software application (456) may include a decryption key accessing component (460) arranged to access a decryption key for decrypting the encrypted payload. The accessed decryption key may correspond to an encryption key having been used at the authentication service provider (102) to encrypt the authentication prompt and may be unique to the authentication service provider and user mobile device.

The decryption key accessing component (460) may be configured to access a mobile device private key securely stored in the mobile device and uniquely associated with a mobile device public key securely stored in at the authentication service provider in association with the mobile device. The decryption key accessing component (460) may be configured to access an authentication service provider public key being uniquely associated with an authentication service provider private key securely stored at the authentication service provider.

In some implementations, the encrypted payload may include a symmetrically encrypted payload and an encrypted symmetric key. The decryption key accessing component (460) may be configured to encrypt the encrypted symmetric key using the authentication service provider public key to output a first decryption of the encrypted symmetric key and decrypt the first decryption of the encrypted symmetric key using the mobile device private key to output a second decryption of the encrypted symmetric key. An asymmetrically encrypted symmetric key may be decrypted using one or both of the authentication service provider public key and the mobile device private key to output the symmetric key.

The mobile software application (456) may include a decryption component (468) arranged to use the decryption key to decrypt the encrypted payload and obtain the nonce and authentication prompt including the transaction details.

In some implementations, the decryption component (468) may be configured to use the second decryption of the encrypted symmetric key to decrypt the symmetrically encrypted payload to obtain the authentication prompt including the transaction details (and optionally the nonce).

The mobile software application (456) may include a display component (470) arranged to display a prompt including the transaction details via a display of the user mobile device and prompting the user (107) of the user mobile device (106) to authenticate the transaction. The token may be included in the prompt displayed to the user. In other implementations the token may be displayed separately or may be transmitted to the authentication service provider responsive to the user inputting his or her authentication of the transaction.

The mobile software application (456) may include a confirmation input receiving component (472) arranged to receive a confirmation input from the user in response to displaying the prompt. The input may be received via an input/output controller (e.g. responsive to the user activating a "Confirm" or similar graphical component displayed on a touch sensitive display of the user mobile device. The user may input the confirmation after reviewing the transaction details having been included in the encrypted payload and satisfying him/herself that the authentication prompt relates to the transaction that is currently underway (and not a transaction being conducted fraudulently against the user account).

The mobile software application (456) may include a token providing component (474) arranged to provide a token based on or including the nonce and/or transaction details for submission to the authentication service provider (102) if the user authenticates the transaction. In some implementations, the token providing component (474) may include a token generating component (476) arranged to generate the token using the transaction details and/or nonce as an input to a predetermined (e.g. challenge-response) algorithm. The algorithm may be known only to the user mobile device (106) and the authentication service provider (102). The algorithm may be any suitable challenge-response algorithm that alters the transaction details and/or nonce in a predetermined manner to output the token. In some cases, user input (in the form of a passcode or biometric) may be used as a further input to the algorithm.

The token providing component (474) may include a token display component (480) arranged to display the token to the user via the display of the user mobile device for submission by the user to the transaction service provider (104) for on-forwarding to the authentication service provider (102) (e.g. via the first communication channel). The token may accordingly be used as a password (e.g. a one-time-password). In some cases, the token may simply be the nonce which the user is required to submit to the transaction service provider (i.e. the token simply includes the nonce) and no algorithm is used to generate the nonce. In such an implementation, the token display component may display the nonce as the token to the user via the display of the user mobile device for submission by the user to the transaction service provider for on-forwarding to the authentication service provider. The token display component (480) may display the token to the user in the prompt together with the transaction details.

In other implementations, the token providing component may include a token transmitting component arranged to transmit the token to the authentication service provider for validation thereat. Transmission may be via the second communication channel (or the secure connection established via the second communication channel). The token may only be generated or transmitted in response to the confirmation input receiving component (472) receiving the confirmation input.

The described system and method may provide two-factor, out-of-band authentication. An authentication service provider generates a graphical code for display on a transacting communication device (e.g. PC) under the control of a registered user. The graphical code may include a payload which is encrypted using one or more encryption keys. The payload includes transaction details which describe the transaction and a nonce. The registered user uses the user mobile device as an authentication device to capture the graphical code. The authentication device then decrypts the payload at least using a securely stored decryption key, which is unique to the user mobile device (e.g. private key of the user mobile device and possibly a public key of the remote server) and displays the payload to the registered user. The registered user can then inspect the transaction details to ensure that they accurately reflect the transaction the user intends conducting and, if satisfied, the user enters the nonce into the communication device to authenticate the transaction.

The described system and method may address a technical problem associated with man-in-the-middle attacks as the authentication and transaction details are tied together. A nefarious third party interposing him/herself between the user and the transaction service provider will not be able to represent to the user (e.g. by way of a spurious website) that the user is conducting transaction A (the transaction the user intends to conduct) while in fact the nefarious third party is fraudulently conducting transaction B and spoofing the user into authenticating transaction B. Because the authentication and transaction details are tied together, should the nefarious third party attempt transaction B against the user account, the user (and only the user) will decrypt the encrypted payload and discover that it actually relates to transaction B and not transaction A. Accordingly, the user will likely not authenticate the transaction.

The described system and method may lead to increased user confidence as the user may trust that the transaction details have not been tampered with (as the user mobile device is a trusted authentication device). As the transaction details are only capable of decryption by the user's authentication device, the user can be sure that the transaction being authenticated is the transaction that the user intends to authenticate (and not a fraudulent transaction being conducted by a man-in-the-middle). Furthermore, due to the nature of decryption (being either success or failure), the cognitive burden of the user may be lessened as the user may not be required to scrutinize the transaction details for accuracy as it is not possible to alter slightly the transaction details. This may be beneficial for business banking scenarios in which a single authentication request may be for tens of transactions (normally in this case visual validation fails).

Figure 5:
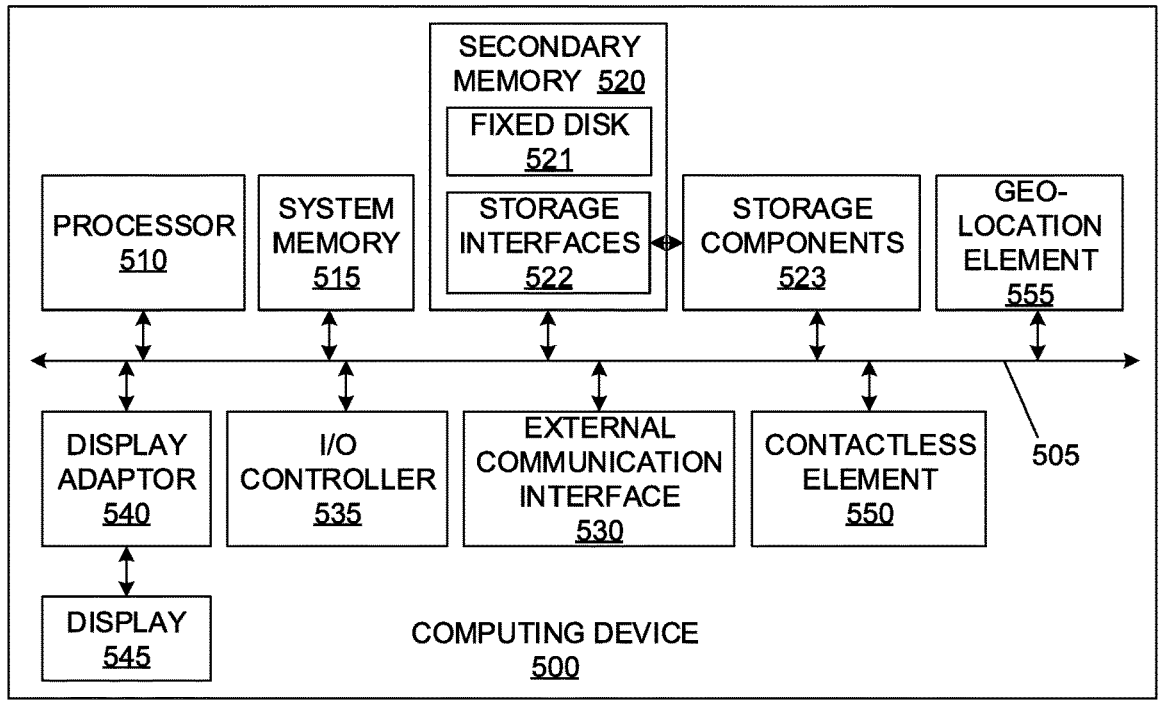
FIG. 5 illustrates an example of a computing device in which various aspects of the disclosure may be implemented.

FIG. 5 illustrates an example of a computing device (500) in which various aspects of the disclosure may be implemented. The computing device (500) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (500) may be suitable for storing and executing computer program code. The various participants and elements in the previously described system diagrams may use any suitable number of subsystems or components of the computing device (500) to facilitate the functions described herein. The computing device (500) may include subsystems or components interconnected via a communication infrastructure (505) (for example, a communications bus, a network, etc.). The computing device (500) may include one or more processors (510) and at least one memory component in the form of computer-readable media. The one or more processors (510) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (500) may be distributed over a number of physical locations (e.g. in a distributed, cluster or cloud-based computing configuration) and appropriate software units may be arranged to manage and/or process data on behalf of remote devices.

The memory components may include system memory (515), which may include read only memory (ROM) and random access memory (RAM). A basic input/output system (BIOS) may be stored in ROM. System software may be stored in the system memory (515) including operating system software. The memory components may also include secondary memory (520). The secondary memory (520)

may include a fixed disk (521), such as a hard disk drive, and, optionally, one or more storage interfaces (522) for interfacing with storage components (523), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (500) may include an external communications interface (530) for operation of the computing device (500) in a networked environment enabling transfer of data between multiple computing devices (500) and/or the Internet. Data transferred via the external communications interface (530) may be in the form of signals, which may be electronic, electromagnetic, optical, radio, or other types of signal. The external communications interface (530) may enable communication of data between the computing device (500) and other computing devices including servers and external storage facilities. Web services may be accessible by and/or from the computing device (500) via the communications interface (530).

The external communications interface (530) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (530) may include a subscriber identity module (SIM) in the form of an integrated circuit that stores an international mobile subscriber identity and the related key used to identify and authenticate a subscriber using the computing device (500). One or more subscriber identity modules may be removable from or embedded in the computing device (500).

The external communications interface (530) may further include a contactless element (550), which is typically implemented in the form of a semiconductor chip (or other data storage element) with an associated wireless transfer element, such as an antenna. The contactless element (550) may be associated with (e.g., embedded within) the computing device (500) and data or control instructions transmitted via a cellular network may be applied to the contactless element (550) by means of a contactless element interface (not shown). The contactless element interface may function to permit the exchange of data and/or control instructions between computing device circuitry (and hence the cellular network) and the contactless element (550). The contactless element (550) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (500) and an interrogation device. Thus, the computing device (500) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (510). A computer program product may be provided by a non-transient computer-readable medium, or may be provided via a signal or other transient means via the communications interface (530).

Interconnection via the communication infrastructure (505) allows the one or more processors (510) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (500) either directly or via an I/O controller (535). One or more displays (545) (which may be touch-sensitive displays) may be coupled to or integrally formed with the computing device (500) via a display (545) or video adapter (540).

The computing device (500) may include a geographical location element (555) which is arranged to determine the geographical location of the computing device (500). The geographical location element (555) may for example be implemented by way of a global positioning system (GPS), or similar, receiver module. In some implementations the geographical location element (555) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (500). In some implementations, the geographical location element (555) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™ C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method conducted at a server computer of an authentication service provider comprising:
   receiving an authentication request, the authentication request requesting authentication of a transaction and including transaction details describing the transaction;
   obtaining an encryption key being unique to the authentication service provider and a user mobile device;
   generating an authentication prompt including at least some of the transaction details;
   encrypting a payload including the authentication prompt using the encryption key to output an encrypted payload; and,
   providing the encrypted payload via a first communication channel to a user for acquisition and decryption by the user mobile device using a decryption key corresponding to the encryption key.

2. The method as claimed in claim 1, wherein the payload includes a nonce and the authentication prompt for encryption.

3. The method as claimed in claim 1, wherein the first communication channel is established between the server computer and a user communication device, and wherein the first communication channel is a secure communication channel.

4. The method as claimed in claim 3, wherein providing the encrypted payload to the user includes transmitting the encrypted payload to the user communication device via the first communication channel for providing the encrypted payload to the user.

5. The method as claimed in claim 3, wherein the authentication request is received from a transaction service provider facilitating the transaction, wherein the first communication channel is established between the server computer, transaction service provider and the user communication device and wherein providing the encrypted payload to the user includes transmitting the encrypted payload to the transaction service provider for on-forwarding to the user device.

6. The method as claimed in claim 1, wherein providing the encrypted payload via the first communication channel includes:
   generating a graphical code based on the encrypted payload; and
   providing the graphical code for display to the user via the first communication channel.

7. The method as claimed in claim 1, wherein obtaining the encryption key includes accessing a mobile device public key stored at the authentication service provider and being uniquely associated with a mobile device private key securely stored in the user mobile device.

8. The method as claimed in claim 7, wherein obtaining the encryption key includes:
   obtaining a symmetric key; and,
   accessing the mobile device public key and an authentication service provider private key being securely stored at the authentication service provider and being uniquely associated with an authentication service provider public key accessible to the mobile device.

9. The method as claimed in claim 8, wherein encrypting the payload includes:
   encrypting the payload using the symmetric key to output a symmetrically encrypted payload;
   asymmetrically encrypting the symmetric key using one or both of the mobile device public key and the authentication service provider private key to output an asymmetrically encrypted symmetric key,
   wherein the encrypted payload includes the symmetrically encrypted payload and the asymmetrically encrypted symmetric key.

10. The method as claimed in claim 1, including:
    receiving a validation request including a token based on or including one or both of the transaction details and a nonce;
    validating the token; and,
    if the token is valid, transmitting an authentication confirmation message confirming authentication of the transaction.

11. A computer-implemented method conducted at a user mobile device comprising:
    capturing an encrypted payload, the encrypted payload including an authentication prompt relating to authentication of a transaction and including transaction details describing the transaction;
    accessing a decryption key for decrypting the encrypted payload, the decryption key corresponding to an encryption key having been used at an authentication service provider to encrypt the payload and being unique to the authentication service provider and the user mobile device;
    using the decryption key to decrypt the encrypted payload to obtain the authentication prompt including the transaction details;
    displaying, via a display of the user mobile device, the authentication prompt including the transaction details and prompting a user of the user mobile device to authenticate the transaction; and,
    providing a token based on or including one or both of the transaction details or a nonce for submission to the authentication service provider.

12. The method as claimed in claim 11, wherein the encrypted payload is provided to the user by a transaction service provider facilitating the transaction, the transaction service provider having received the encrypted payload from the authentication service provider.

13. The method as claimed in claim 11, wherein accessing the decryption key includes accessing a mobile device private key securely stored in the mobile device and uniquely associated with a mobile device public key stored at the authentication service provider in association with the mobile device.

14. The method as claimed in claim 13, wherein accessing the decryption key includes:

accessing the mobile device private key and an authentication service provider public key being uniquely associated with an authentication service provider private key securely stored at the authentication service provider.

15. The method as claimed in claim 14, wherein the encrypted payload includes a symmetrically encrypted payload and an asymmetrically encrypted symmetric key, and wherein the method includes asymmetrically decrypting the symmetric key using one or both of the authentication service provider public key and the mobile device private key to output the symmetric key.

16. The method as claimed in claim 15, wherein using the decryption key to decrypt the encrypted payload includes using the output symmetric key to decrypt the symmetrically encrypted payload to obtain the authentication prompt including the transaction details.

17. The method as claimed in claim 11, wherein the token is based on the nonce, and wherein providing the token includes:
    generating the token using the nonce as an input to an algorithm; and,
    displaying the token to the user via the display of the user mobile device for submission by the user to the authentication service provider.

18. The method as claimed in claim 11, wherein the token is based on the transaction details, and wherein providing the token includes:
    generating the token using the transaction details as an input to an algorithm; and, displaying the token to the user via the display of the user mobile device for submission by the user to the authentication service provider.

19. The method as claimed in claim 11, wherein displaying the token to the user includes displaying the token in the prompt together with the transaction details.

20. A system including a server computer of an authentication service provider including memory for storing computer-readable program code and a processor for executing the computer-readable program code, the server computer comprising:
    an authentication request receiving component for receiving an authentication request, the authentication request requesting authentication of a transaction and including transaction details describing the transaction;
    an encryption key obtaining component for obtaining an encryption key being unique to the authentication service provider and a user mobile device;
    an authentication prompt generating component for generating an authentication prompt including at least some of the transaction details;
    an encrypting component for encrypting a payload including the authentication prompt using the encryption key to output an encrypted payload; and,
    a prompt providing component for providing the encrypted payload via a first communication channel to a user for acquisition and decryption by the user mobile device using a decryption key corresponding to the encryption key.

21. The system of claim 20, further including a user mobile device including memory for storing computer-readable program code and a processor for executing the computer-readable program code, the user mobile device comprising:
    a capturing component for capturing the encrypted payload including the authentication prompt relating to authentication of a transaction and including transaction details describing the transaction;
    a decryption key accessing component for accessing a decryption key for decrypting the encrypted payload, the decryption key corresponding to the encryption key;
    a decryption component for using the decryption key to decrypt the encrypted payload to obtain the authentication prompt including the transaction details;
    a display component for displaying, via a display of the user mobile device, the authentication prompt including the transaction details and prompting the user of the user mobile device to authenticate the transaction; and,
    a token providing component for providing a token based on or including one or both of the transaction details or a nonce for submission to the authentication service provider.

* * * * *